Feb. 25, 1964     T. L. ATKINSON     3,122,273
LAWN SPREADER

Filed May 16, 1961     2 Sheets-Sheet 1

INVENTOR.
TRUMAN L. ATKINSON

BY

ATTORNEYS

Feb. 25, 1964 T. L. ATKINSON 3,122,273
LAWN SPREADER

Filed May 16, 1961 2 Sheets-Sheet 2

INVENTOR.
TRUMAN L. ATKINSON
BY
ATTORNEYS

United States Patent Office 3,122,273
Patented Feb. 25, 1964

1

3,122,273
LAWN SPREADER
Truman L. Atkinson, 609 Lake Shore Drive,
Ludington, Mich.
Filed May 16, 1961, Ser. No. 110,535
6 Claims. (Cl. 222—41)

This invention relates to a lawn spreader and more particularly to improvements in the gate and control mechanism of the lawn spreader.

Various types of lawn spreaders are presently in existence. These spreaders are utilized to distribute material such as fertilizer or seed over the ground.

A problem which has been encountered in such lawn spreaders is that the material, e.g., fertilizer, collects in the area between the gate and the bottom of the spreader hopper. The gate operates to open and close apertures (or a progressive portion of the apertures) to regulate the quantity of materal distributed. If the material collects in this area, the apertures may become plugged and the operation of the gate sluggish. Therefore, it is desirable to keep this area clean. To clean existing gate structures it is necessary to remove screws and remove the gate to gain access to the area which needs cleaning. Since this requires the use of tools and considerable time, the user of the lawn spreader neglects to perform the proper cleaning necessary. The material thus builds up and results in the prevention of the proper quantity of material being spread. Also, if the cleaning of the gate is neglected for a sufficient length of time, the material will build up and cause the gate to buckle in the center. Thereafter, when the gate is cleaned the buckle remains resulting in permanent damage to the spreader.

The instant invention overcomes these difficulties by providing a gate which is spring biased against the bottom of the hopper. The spring will yield readily and allow cleaning of the gate after each use if necessary. The cleaning operation can be accomplished without the necessity of numerous tools and can be done in a very short time. Also, if the cleaning operation is neglected and material builds up on the gate, the springs will yield, thus preventing the gate from buckling and being permanently damaged.

The present invention also provides novel control means for moving the gate to various degrees of aperture cover. In previous lawn spreaders it has been necessary to provide a separate lever on the spreader handle to adjust the position of the gate. In the instant invention the control rod is connected directly to rotatable handle bars carried by the spreader handle. The operator is thus able to open or close the gate by merely rotating the handle bars of the spreader. A novel over-center link mechanism maintains the gate closed or opened as the case may be, eliminating the necessity of continued rotative pressure on the handle bars to maintain the gate in the desired position.

The control assembly has an adjustment plate which cooperates with the control rod to regulate the position of the gate and thus the extent of the apertures exposed and the quantity of material discharged. This arrangement is extremely simple, providing an advantage over many prior art structures.

It is therefore an object of this invention to provide a lawn spreader which has a gate that is resiliently urged into contact with the bottom of the spreader hopper.

2

Another object of this invention is to provide the gate of a lawn spreader with adjustable positioning means.

Still another object of this invention is to provide a lawn spreader having a gate which is resiliently biased into position, and that will yield readily to facilitate cleaning and prevent permanent damage to the gate should material accumulate between the hopper and the gate.

Still another object of this invention is to provide a lawn spreader having control means for the gate which is operated by a rotatable handle bar unit, and over-center length means for maintaining the gate in open or closed position.

Another object of this invention is to provide novel means for controlling the degree of movement of the control means which in turn determines the degree to which the gate is opened.

Still another object of this invention is to provide a lawn spreader having a minimum number of component parts which can be manufactured and assembled economically, thus providing a competitive article of manufacture.

These and other objects and advantages of this invention will become more apparent upon reading the specification in conjunction with the drawings.

Figure 1:
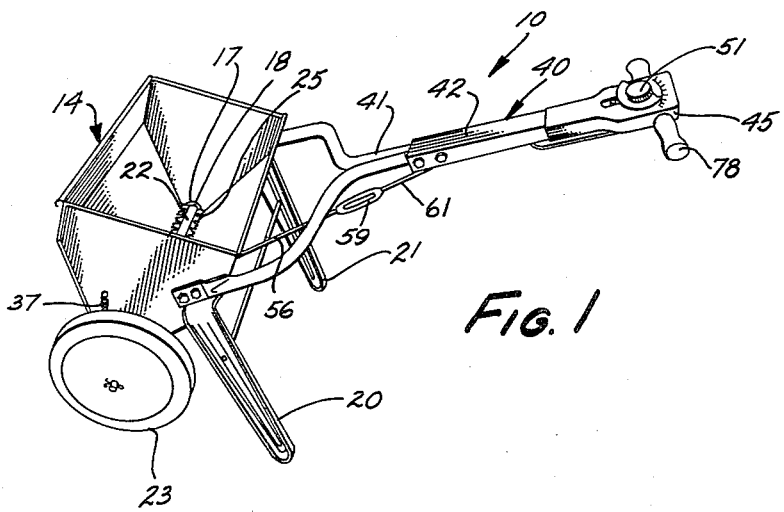
FIG. 1 is a perspective view of the lawn spreader of this invention.

Basically, this invention relates to improvements in the conventional lawn spreader which has a hopper of conventional design. The hopper is provided with an axle running therethrough and located adjacent the bottom. The ends of the axle project beyond the ends of the hopper and are provided with wheels for transporting the hopper. A handle is connected to the hopper to provide means whereby the operator may push the spreader. The bottom of the hopper is provided with apertures through which the material carried by the hopper is discharged. A gate covers the apertures and can be opened progressively until the apertures are fully exposed. The gate has a lost motion connection with the hopper and is resiliently urged into engagement with the hopper. This arrangement allows the gate to be displaced a necessary distance from the hopper for cleaning purposes and also prevents bending of the gate due to accumulation of materials between it and the hopper. A control rod is connected at one end to the gate and at the other end to an over-center link arrangement which in turn is connected to rotatable handle bars carried by the handle. Rotation of the handle bars results in translation of the operating rod and movement of the gate to uncover the apertures. The end of the operating rod remote from the gate is provided with a finger which is operable in an adjustment slot formed in the handle head. An adjustment plate is carried by the handle head and movable to limit the degree of travel of the finger within the adjustment slot, and thus the degree of translation of the operating rod and movement of the gate.

The lawn spreader assembly is designated generally by the reference numeral 10. The assembly 10 includes a hopper 14 having legs and a wheel mechanism, the gate 30, the handle unit 40, and the control assembly 55.

Figure 5:
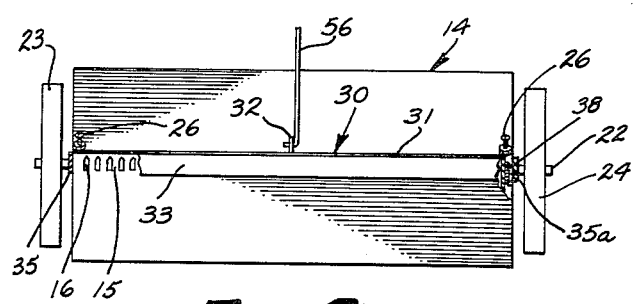
FIG. 5 is an enlarged, fragmentary plan view of the bottom of the lawn spreader with a portion of the gate cut away to reveal the apertures in the bottom of the hopper.
Figure 2:
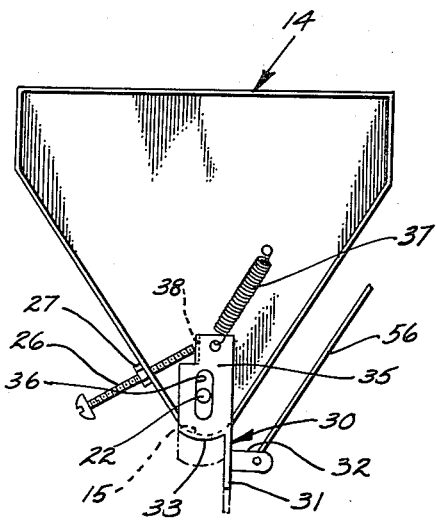
FIG. 2 is an enlarged, fragmentary side elevational view of the lawn spreader, showing the wheels removed to reveal the gate structure.

Referring now more specifically to the details of the invention, FIGS. 1, 2 and 5 best illustrate the hopper 14 now to be described in detail. The hopper 14 is of conventional design having sides forming a generally V-shaped, troughlike structure with end closure members. The end closure members are inset leaving an over-hang of the V-shaped portion at either end. The over-hangs are provided with threaded apertures which receive positioning screws 26 and 28 (FIGS. 2 and 5). The screws are provided with lock nuts 27 which bear against the hopper. The positioning screws are utilized to level the gate in a manner which will be explained more fully hereinafter. The bottom 15 of the trough is in the form of a segment of a sphere and is provided with a series of apertures 16 (FIG. 5) spaced at equal intervals along its length. The hopper may be made of sheet metal or equivalent material. Adjacent the bottom 15, the ends of the hopper are provided with a pair of aligned axle openings 17 which in turn are provided with bushings 18 (FIG. 1) of conventional design. An axle 22 is of sufficient length to extend through the hopper and project a substantial distance on either side. The projecting portions of the axles are provided with wheels 23 and 24 which are maintained in position in a conventional manner. At least one of the wheels is keyed to the shaft such that the rotation of the wheels will cause the shaft to rotate. This in turn effects rotation of the agitator strips 25 (FIG. 1) secured to the axle portion which passes through the hopper. The rotation of the agitator strip forces the material carried by the hopper through the apertures 16 in the bottom 15. The hopper 14 is also provided with a pair of legs 20 and 21 which are fixed to its ends. The legs cooperate with the wheels to provide means for maintaining the hopper in an upright position when the operator leaves the assembly.

The gate 30 (FIGS. 2 and 5) covers the apertures 16 in varying degrees, thereby determining whether or not material carried by the hopper is to be distributed, and the amount to be distributed. This gate 30 includes a flange 31 which is formed integral with a shutter plate 33. The shutter plate 33 is positioned at an angle generally transverse to the flange 31. Both members extend along the length of the bottom of the hopper. The shutter plate 33 has a greater width dimension than the greatest dimension of the apertures 16. Thus, when it is in contact with the hopper bottom it may completely cover the apertures and prevent discharge of material from the hopper. The flange 31 has an attachment tab 32 extending from its center. The attachment tab is associated with the control mechanism 55 to be explained more fully hereinafter.

Fixed to each end of the shutter plate 33 are wings 35 and 35a (FIG. 5). The wings 35 and 35a project in the opposite direction from the flange 31 and lie adjacent the ends of the hopper 14. The wing 35 is provided with a lost motion slot 36 (FIG. 2), and the wing 35a includes a similar slot (not shown). The axle 22 projects through the lost motion slots and acts as a guide member for the wing. Due to the lost motion between the wings and the axle 22 the gate 30 may be displaced with respect to the hopper. The axle 22 also operates as a pivot point about which the gate 30 may move, enabling the shutter plate 33 to uncover the apertures 16.

The wings 35 and 35a each receive one end of a spring 37, the other end of the springs being fixed to the ends of the hopper. The springs 37 constantly urge the shutter plate 33 into contact with the hopper bottom 15. The springs yield to allow the gate to move away from the hopper to facilitate removal of material which may have collected on the shutter plate. From FIG. 2, it can also be seen that should a substantial amount of material collect between the bottom of the hopper and the shutter plate, the spring will yield preventing a permanent buckle in the center of the gate. The wings are also provided with inturned stops 38. The ends of positioning screws 26 engage the stops to provide transverse alignment of the gate with respect to the hopper in a manner which will be explained more fully hereinafter.

Figure 4:
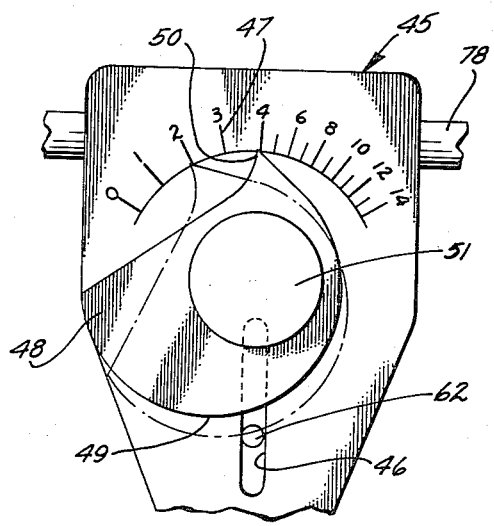
FIG. 4 is an enlarged front elevational view of the handle head showing the interrelation of the control mechanism with the adjustment plate.
Figure 3:
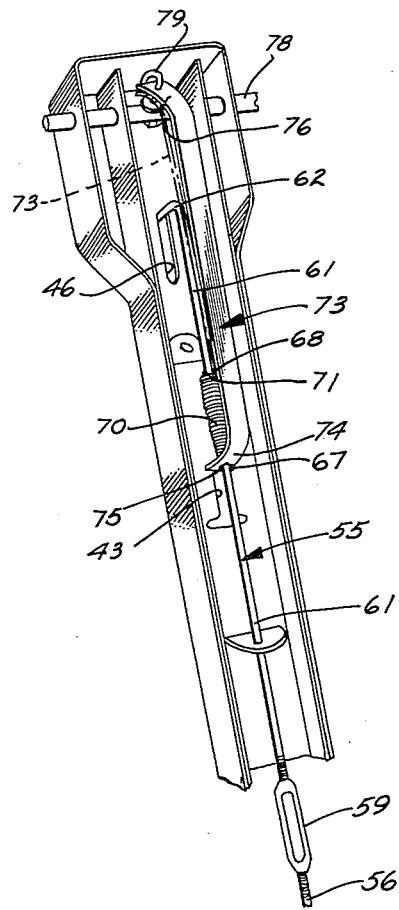
FIG. 3 is an enlarged, fragmentary perspective view of the back of the spreader handle showing the over-center link of the control mechanism.

The handle unit 40 is best illustrated in FIGS. 1, 3 and 4. The lower handle is in the shape of a Y and straddles the end of the hopper. The lower handle may be fixed to the hopper by the same fasteners which secure the legs 20 and 21 to the hopper. An intermediate handle post 42 is fixed to the stem portion of the lower handle by conventional fasteners. The back side of the intermediate post 42 is provided with a T-shaped guide slot 43 (FIG. 3) for the purposes of guiding a portion of the control mechanism 55 to be explained more fully hereinafter.

The handle head 45 is fixed to the intermediate post 42 in a conventional manner such as by welding and is somewhat wider than the intermediate post 42. It has a centrally located adjustment slot 46 which is positioned along the longitudinal axis of the handle. Located above the adjustment slot 46 is indicia 47. The indicia and the adjustment slot are aligned with segments of the control assembly 55. Located between the upper end of adjustment slot 46 and the indicia 47 is a threaded aperture which received the stud of clamp knob 51 (FIGS. 1 and 4). Located between the clamp knob 51 and the face of the head 45 is an adjustment plate 48. The adjustment plate 48 has an edge 49 which is generally involute with respect to the point about which it pivots on the stud of the clamp knob 51. A pointer 50 is formed on the adjustment plate 48 so as to cooperate with the indicia 47. The function of the adjustment plate will be explained more fully in the description of the operation of the invention.

The control assembly 55 is best illustrated in FIG. 3. It includes a lower control rod 56 which has one end thereof pivotally fastened to the attachment tab 32 of gate 30. The other end of lower control rod 56 is connected to turn buckle 59. Upper control rod 61 has one end connected to the turn buckle 59 and the other end bent transversely to form a finger 62. The finger 62 projects through the adjustment slot 46 as best shown in FIGS. 3 and 4. Stops 67 and 68 are formed on the upper control rod 61 and are spaced from each other and assume a position adjacent the T-shaped guide slot 43 formed in the intermediate post 42. A U-shaped over-center link 73 has an aperture in one of its arms 74 through which the upper control rod 61 passes. The arm 74 of the over-center link is located just above the stop 67. The end of arm 74 is provided with a lug 75 which is of greater width than the stem portion of T-slot 43. The lug 75 retains the arms 74 of the over-center link in the guide slot 43, but allows it to move vertically in the slot. The opposite arm 76 of the over-center link 73 is also provided with an aperture which receives an operator ring 79 to be explained more fully hereinafter. A compression spring 70 surrounds the upper control rod 61 and is located between the inner surface of the over-center link arm 74 and the stop 68. A retainer washer 71 is located between the stops 68 and the one end of compression spring 70 to provide a reaction surface for the one end of the spring.

The handle head 45 is provided with apertures through the edges thereof, providing a journal for handle bar 78. The handle bar 78 projects through the head 45 and projects a substantial distance beyond either edge. The projecting portions may be provided with conventional handle grips such as those shown in FIG. 1. The operator ring 79 has a threaded stud which projects through the center of the handle bar 78 as best shown in FIG 3. The loop of the ring also passes through the aperture formed in the arm 76 of over-center link 73.

*Operation*

When the lawn spreader 10 is assembled, a degree of tension is placed on the compression spring 70 This is accomplished by rotating the turn buckle 59 (FIGS. 1 and 3). The over-center link 73 has its arm 76 fixed to the operator ring 79 which prevents its longitudinal movement during adjustment. When the turn buckle 59 is rotated, the upper control rod 61 is drawn downwardly, as viewed in FIG. 3, the stop 68 thereon moving the retainer washer 71 which compresses the spring 70 between washer 71 and the over-center link arm 74.

When the handle bar 78 is rotated, the operator ring 79 moves through an arc of greater than 180 degrees. When moved in one direction, it carries the over-center link 73 to move the control rod 61 upwardly. The control rod moves upwardly as a result of arm 74 of the over-center link 73 acting upon the spring 70 which applies a force to the retainer washer 71 abutting the stop 68 formed on the control rod. When the handle bar 78 is rotated in the opposite direction the over-center link arm 74 operates directly against the stop 67 formed on the control rod. Such motion is in turn conveyed by the control rod 61 to the rod 56 and to the gate 30. Thus, rotation of the handle bar 78 results in the opening and closing of the apertures 16.

The degree of movement of the control rod and thus the extent of movement of the gate is controlled by the adjustment plate 48. As best shown in FIG. 4, the edge 49 of the adjustment plate may be positioned with respect to the adjustment slot 46 such that the finger 62 is allowed to travel throughout substantially the entire length of the slot, or only a very small distance in the slot. The adjustment plate 48 is positioned by loosening the clamping knob 51 and positioning the plate as desired and thereafter tightening the knob to lock the plate in position. The assembly is calibrated with respect to the indicia 47 to provide a predetermined increasing amount of movement of the finger 62 for each setting. If the pointer 50 is set on 1 the finger 62 is allowed to move a very small distance. Correspondingly, the entire control rod moves only a very small distance and the gate therefore uncovers only a small portion of the apertures 16 in the hopper bottom. However, if the pointer is set on 14, the control rod is allowed to move the full distance and the gate is moved to fully uncover the aperture 16.

Since the operator ring 79, when rotated by the handle bar 78, moves through an arc greater than 180 degrees, the point of attachment of the over-center link arm 76 is carried beyond an imaginary plane passing through the center of the control rod. Due to the compression of the spring, when this occurs, the link is held in the over-center position. This is true when the handle bar is rotated in either extreme direction, and provides a means for maintaining the gate in the fully closed position or in the open position as determined by the adjustment plate 48. This is true, regardless of the position of the adjustment plate, the spring 70 merely being compressed more if the control rod is allowed to move only a very short distance. This explains why the turn buckle must be adjusted so that there is always a certain amount of compression on the spring 70.

If desired, the positioning screws 26 may be utilized to align the gate transversely with respect to the hopper. This is accomplished by loosening the locking nuts 27 and backing the positioning screws 26 off from the stops 38 until there is no contact with the stops when the gate is fully open. The adjustment plate is set at the desired setting and the gate then opened to this setting. The positioning screws are advanced until they engage the stops. If the gate 30 is not aligned so that each aperture 16 is exposed the same amount, one of the screws is advanced or the other backed off until proper alignment is accomplished. The lock nuts 27 are then tightened to fix the positioning screws relative to the hopper. If the positioning screws are utilized they must be reset each time a different adjustment plate setting is made. The positioning screws provide means whereby the setting for distribution of material, such as fertilizer, is very accurate.

Since the gate 30 is resiliently urged into contact with the hopper bottom, and has a lost motion connection with the axle 22, it is a simple matter to force the gate away from the hopper to clean between the gate and the bottom of the hopper. This can be done after each use of the lawn spreader without substantial inconvenience.

From the above description it is apparent that the gate is arranged so that it can be cleaned readily. Also, if cleaning is neglected and material accumulates between the gate and the hopper, permanent damage to the gate will not result since the springs will yield before the gate is forced to bend and be permanently damaged. The gate may be closed by merely rotating the handle bar. Due to the over-center link arrangement, the gate is maintained in the open or closed position. The adjustment plate may be positioned readily to provide for the proper gate opening and distribution of material from the hopper. The spreader is composed of a minimum number of component parts which are of simple design and readily assembled, providing for a competitive article of manufacture.

While a preferred embodiment of this invention has been described, it will be understood that modifications and improvements may be made thereto. Such of these modifications and improvements as incorporate the principles of this invention are to be considered as included in the hereinafter appended claims unless these claims by their language expressly state otherwise.

I claim:

1. A lawn spreader, comprising: a hopper adapted to receive material to be spread; an axle journaled adjacent the bottom of said hopper and being provided with wheel means for transporting said hopper; handle means fixed to said hopper for pushing said lawn spreader; apertures formed in the bottom of said hopper for discharging said material; a gate including a shutter plate conforming to the bottom of said hopper and covering said apertures; wing members fixed to either end of said gate and projecting therefrom, said wings having lost motion slots receiving the ends of said axle; springs connected to said wings and to the hopper constantly urging said shutter plate into contact with the bottom of said hopper; said shutter plate being movable by control means to uncover said apertures and thereby regulate discharge of said material, said springs and lost motion slot allowing ready displacement of said gate from said hopper bottom to facilitate cleaning said hopper bottom and shutter plate.

2. A lawn spreader as defined in claim 1 wherein said control means includes a control rod connected between said gate and a handle bar carried by said handle, rotation of said handle bar resulting in movement of said gate to uncover said aperture.

3. A lawn spreader as defined in claim 2 wherein an overcenter link means is connected between said control rod and said handle bar to maintain said gate open or closed upon rotation of said handle bar, a spring means operably connected between said link means and said control rod for biasing said link means away from said handle bar.

4. A lawn spreader as defined in claim 3 wherein said control rod has a finger operable in an adjustment slot formed in said handle, an adjustment plate carried by said handle and being positionable to limit movement of said finger in said adjustment slot and thereby the movement of said control rod to cause said gate to uncover said apertures.

5. A lawn spreader as defined in claim 4 wherein said adjustment plate has a generally involute surface rotatable to limit the degree of movement of said finger, said adjustment plate being calibrated with respect to a scale on said handle to progressively limit the degree of movement of said finger in said adjustment slot and thereby the degree to which said gate uncovers said apertures.

6. A lawn spreader as defined in claim 1 wherein said wing members include stops, positioning screws carried by said hopper and engaging said stops, said positioning screws being movable relative to each other to provide precise alignment of said gate with respect to said apertures.

References Cited in the file of this patent
UNITED STATES PATENTS

| | | |
|---|---|---|
| 2,703,193 | Seltzer | Mar. 1, 1955 |
| 2,710,116 | Juzwiak | June 7, 1955 |
| 2,733,839 | Blum | Feb. 7, 1956 |
| 2,840,275 | Liljenberg | June 24, 1958 |
| 2,973,884 | Peoples et al. | Mar. 7, 1961 |